United States Patent [19]
Gold et al.

[11] Patent Number: 5,213,282
[45] Date of Patent: May 25, 1993

[54] MANEUVER FEEL SYSTEM FOR A ROTARY WING AIRCRAFT

[75] Inventors: Phillip J. Gold, Shelton; Stuart C. Wright, Woodbridge, both of Conn.

[73] Assignee: United Technologies Corporation, Hartford, Conn.

[21] Appl. No.: 751,456

[22] Filed: Aug. 28, 1991

[51] Int. Cl.⁵ .................. B64C 13/46; B64C 13/50; B64C 11/34

[52] U.S. Cl. .................. 244/17.13; 244/181; 244/223; 244/228; 364/434

[58] Field of Search ............. 244/17.13 X, 175, 179, 244/181 X, 193, 223 X, 228 X; 364/434

[56] References Cited
U.S. PATENT DOCUMENTS

| | | | |
|---|---|---|---|
| 4,129,275 | 12/1978 | Gerstine et al. | 244/181 |
| 4,206,891 | 6/1980 | Perez et al. | 244/17.13 |
| 4,313,165 | 1/1982 | Clelford et al. | 364/424 |
| 4,420,808 | 12/1983 | Diamond et al. | 364/434 |
| 4,563,743 | 1/1986 | Murphy et al. | 244/17.13 |
| 4,849,900 | 7/1989 | Blight et al. | 364/434 |
| 5,062,583 | 11/1991 | Lipps et al. | 364/434 |
| 5,117,362 | 5/1992 | Peckham et al. | 244/181 |

Primary Examiner—Joseph F. Peters, Jr.
Assistant Examiner—Virna Lissi Ansley
Attorney, Agent, or Firm—Patrick J. O'Shea

[57] ABSTRACT

A helicopter fly-by-wire flight control system (21) includes a model following control system architecture which provides the pilot with maneuvering feel. Maneuvering feel is generated by varying the gain of a rate model (52) in the control system to schedule a constant sidearm controller force per g of load factor currently on the helicopter main rotor. This gain variation works in conjunction with control logic which requires the pilot to apply a nose up pitch command during steep banked turns in order to offset a control system induced downward (pitch) bias of the aircraft nose. The control system induced bias is generated only during steep banked turns, thus allowing the pilot to fly shallow banked coordinated turns without having to apply a nose up pitch command.

10 Claims, 6 Drawing Sheets

MANEUVER FEEL SYSTEM FOR A ROTARY WING AIRCRAFT

DESCRIPTION

Technical Field

This invention relates to a flight control system for rotary wing aircraft, and more particularly to fly-by wire flight control systems.

Background Art

When a pilot executes a roll maneuver in a rotary wing aircraft (e.g. helicopter) the amount of vertical lift produced by the aircraft decreases which, if unabated, places the aircraft in a slight descent. To maintain altitude throughout the roll the pilot pitches the aircraft nose upward to arrest the descent. In addition, the pilot applies aft stick to pitch the nose upward to maintain airspeed and keep the turn coordinated.

The upward pitch of the aircraft produces positive G force loading of the main rotor which, in mechanical linkage control systems, is transmitted back to the aircraft cyclic (displacement) stick, providing the pilot with tactile feedback on the severity of the load. This feedback provides a "maneuvering feel".

With the advent of aircraft fly by wire control systems, the control stick manipulated by the pilot is no longer linked directly via mechanical linkages to the control surfaces of the aircraft. Generally in a fly by wire control system the commands from the pilot are input to a digital computer which calculates and provides electrical command signals to the aircraft control surfaces. Therefore, there is no longer a direct mechanical link between the pilot and the aircraft control surfaces to provide the pilot with maneuvering feel.

This lack of maneuvering feel is particularly troublesome to a pilot of an attack helicopter since he may spend a great deal of his time scanning outside the aircraft, rather than closely monitoring the cockpit avionics. Hence, providing maneuvering feel to the pilot through the control stick he manipulates is obviously of critical importance because what the pilot feels from the aircraft surfaces through the stick is crucial for providing the pilot with sensory inputs to allow him to fly the aircraft closer to its full capability. Maneuvering feel is also necessary to allow the pilot to perceive when the aircraft is approaching the limits of its flight envelope.

When the pilot commands a banked turn, both yaw and pitch commands are required to ensure the turn is coordinated and airspeed remains constant throughout the turn. However, when the pilot applies a pitch command during the banked turn, a load factor (also referred to as a G-load) is imparted on the aircraft. The steeper the banked turn the greater the pitch input the pilot has to provide, and therefore the greater the load factor imparted on the aircraft.

For rotary wing aircraft the load factor generated by a pitch command is essentially proportional to airspeed times pitch rate. As an example, at 160 knots the load factor generated while in a 5 deg/second pitch up maneuver is approximately twice the load factor generated at 80 knots for the same pitch rate. Therefore it is essential to provide the pilot with the feel on the stick of the load factor being imparted on the aircraft due to the pitch command.

U.S. Pat. No. 4,313,165 assigned to the assignee of the present invention discloses a system which provides a force-feel on a helicopter control stick in relation to the amount of force the pilot is placing on the stick. The patent further discloses scheduling the amount of force-feel to be applied to the stick as a function of the pilot applied force. Similarly, commonly assigned U.S. Pat. No. 4,206,891 discloses a system which provides force-feel on the rudder pedals indicative of the amount of side slip the pilot is commanding on the pedals. By providing this force-feel, the pilot feels via the force on the pedals, the amount of side slip he is commanding and therefore he is cued to avoid excessive side slip, and hence avoid destructive overloading of the tail rotor. However, neither of these discusses the problems associated with maneuvering feel using a force type sidearm controller, or the problems associated with providing maneuvering feel in a banked turn.

During standard maneuvering turns at low bank angles and load factor, it is desired that the fly-by-wire control system automatically provide the pitch and yaw commands necessary to ensure the turn is coordinated. This helps reduce the work load on the pilot since he only has to input a roll command, rather than simultaneously applying roll, pitch and yaw commands. While at the same time, it is desired that the pilot be provided with maneuvering feel at steep bank angles and load factors so he can feel on the stick the load factor imparted on the aircraft during the aggressive maneuver he is flying.

A system which incorporates both these features is highly desirable for its advantages of firstly reducing pilot workload during gentle maneuvering, and secondly providing maneuvering feel to the pilot during more aggressive maneuvers.

DISCLOSURE OF THE INVENTION

An object of the present invention is to provide maneuvering feel for the pilot on the aircraft control stick.

Another object of the present invention is to provide the pilot with adequate maneuvering feel to enable him to recognize that the aircraft is approaching the limits of its flight envelope.

Another object of the present invention is to provide a constant stick force per g of load factor.

Yet another object is to provide maneuvering feel for the pilot on the control stick by requiring the pilot to pitch the aircraft nose up in steep banked turns.

A further object is to provide no maneuvering feel for the pilot on the control stick during a shallow banked turn.

According to the present invention, a rotary wing aircraft flight control system receives inputs from a force type multi-axis sidearm controller, and schedules via an aircraft rate command model a set point for the aircraft pitch rate of change as a function of a pitch command signal from the sidearm controller, the rate command model is responsive to airspeed in order to schedule a constant stick force per g of load factor; the set point is used as a reference for: (1) a pitch rate of change feedback path; an integrated value of the set point is used for (2) a pitch feedback path which includes provisions for providing maneuvering feel in a steeped banked turn while cancelling the maneuvering feel at shallow banked angle turns; and (3) a feedforward control path having an inverse vehicle model to provide a command signal indicative of the command necessary for the aircraft to respond in a manner defined by the set point; signals from all three paths are summed to provide a magnitude and rate limited command signal which is applied to the aircraft main rotor to drive the aircraft towards a pitch rate response which is substantially equal to the desired set point.

The present invention provides maneuvering feel by varying the gain of the pitch rate command model as a function of airspeed, and requiring a positive pitch command from the sidearm controller to pitch the aircraft nose up during steep bank angle turns. Varying the gain of the rate command model provides constant stick force per g of load factor throughout the range of pitch commands from the force type sidearm controller. The present invention also automatically compensates for aircraft nose down pitching during shallow banked turns, which reduces pilot work load, since pilot provided a nose up pitch command is not required during shallow banked turns to maintain a coordinated turn.

These and other objects, features and advantages of the present invention will become more apparent in light of the following detailed description of an exemplary embodiment thereof, as illustrated in the accompanying drawings.

BEST MODE FOR CARRYING OUT THE INVENTION

Figure 6:
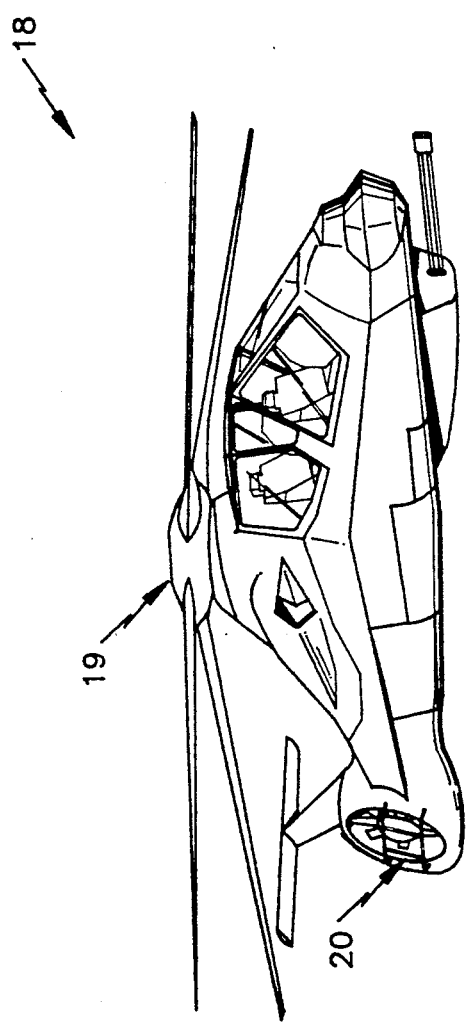
FIG. 6 is a pictorial illustration of an aircraft in which the flight control system embodiment of FIG. 1 may be used.

Referring first to FIG. 6, which is a pictorial illustration of a helicopter embodiment 18 of a rotary wing aircraft in which the present invention may be used. The helicopter includes a main rotor assembly 19 and tail rotor assembly 20.

Figure 1:
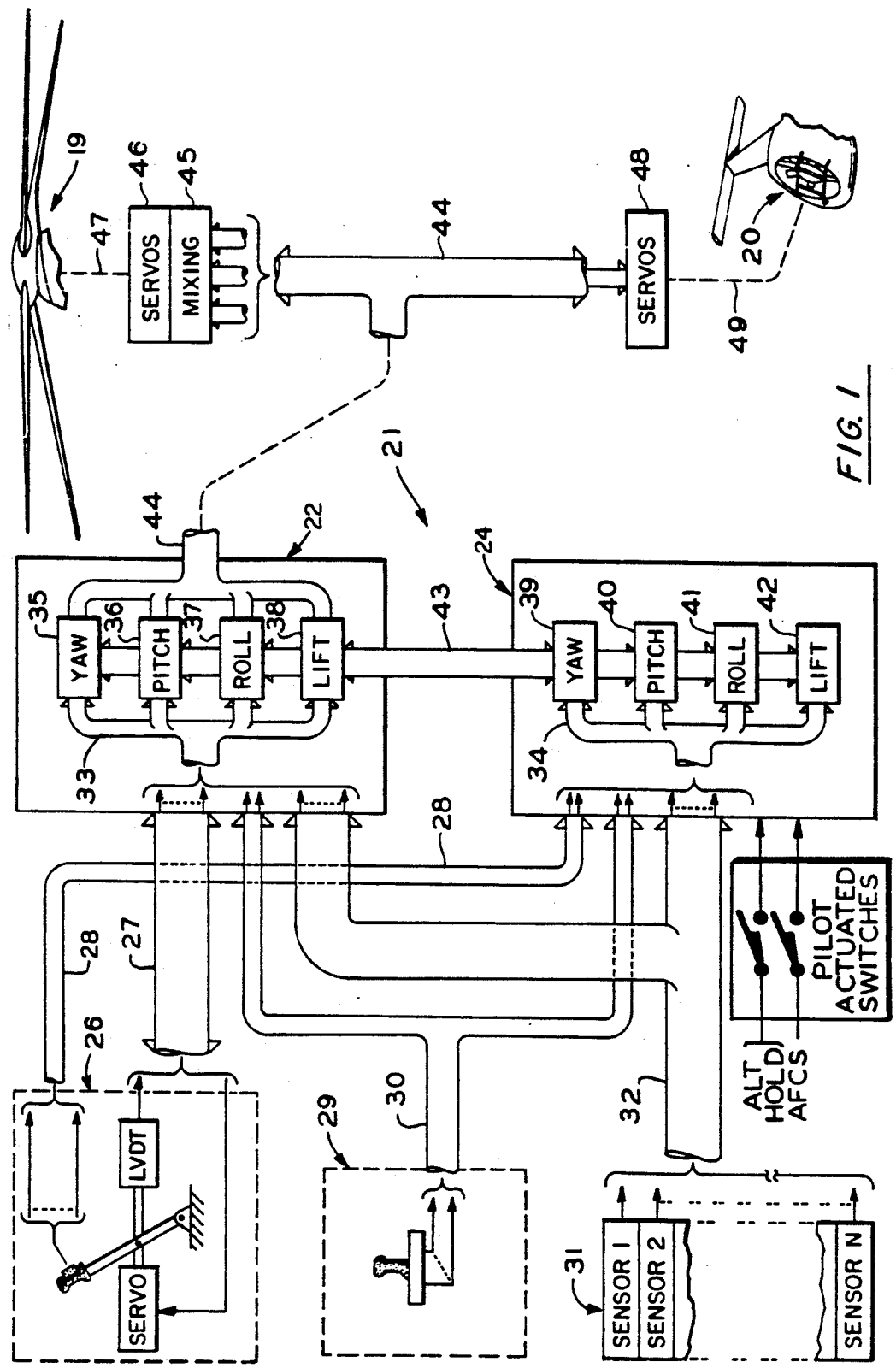
FIG. 1 is an illustration of a rotary wing aircraft flight control system having a Primary Flight Control System (PFCS) and an Automatic Flight Control System (AFCS)

Referring now to FIG. 1, the helicopter flight control system of the present invention 21 is a model following control system which shapes the pilot's sidearm controller and displacement stick commands through an "inverse vehicle model" to produce a desired aircraft response. The system includes a Primary Flight Control System (PFCS) 22 and an Automatic Flight Control System (AFCS) 24. The PFCS receives displacement command output signals from a displacement collective stick 26 on line 27 and the AFCS receives the collective stick discrete output signals on a line 28. The PFCS and AFCS each receive the force output command signals of a force type four axis sidearm controller 29, on lines 30, and the aircraft's sensed parameter signals from sensors 31, on lines 32. The pilot command signals on lines 27, 28, and 30 and the sensed parameter signals on lines 32 are shown consolidated within trunk lines 33 and 34 in the PFCS and AFCS, respectively.

The PFCS and AFCS each contain control channel logic for controlling the yaw, pitch, roll and lift axes of the aircraft. In FIG. 1 these logic modules are shown by blocks 35-38 for the PFCS and blocks 39-42 for the AFCS. The PFCS provides rotor command signals and the AFCS logic provides conditioning and/or trimming of the PFCS four axis logic functions. The PFCS and AFCS logic modules interconnect through bus 43.

As described in detail hereinafter, the PFCS and AFCS use a model following algorithm in each control axis to provide rotor command signals on output lines to a main rotor mixing function 45 which commands displacement of mechanical servos 46 and linkages 47 to control the tip path plane of the main rotor 19. Rotor command signals are also provided on lines 44 to the helicopter's tail rotor servos 48 which control the thrust of the tail rotor 20 through linkages 49. The sensed parameter signals from sensors 31, on lines 32, provide the PFCS and AFCS with the aircraft's angular rate and attitude response to the rotor command signals.

Figure 2:
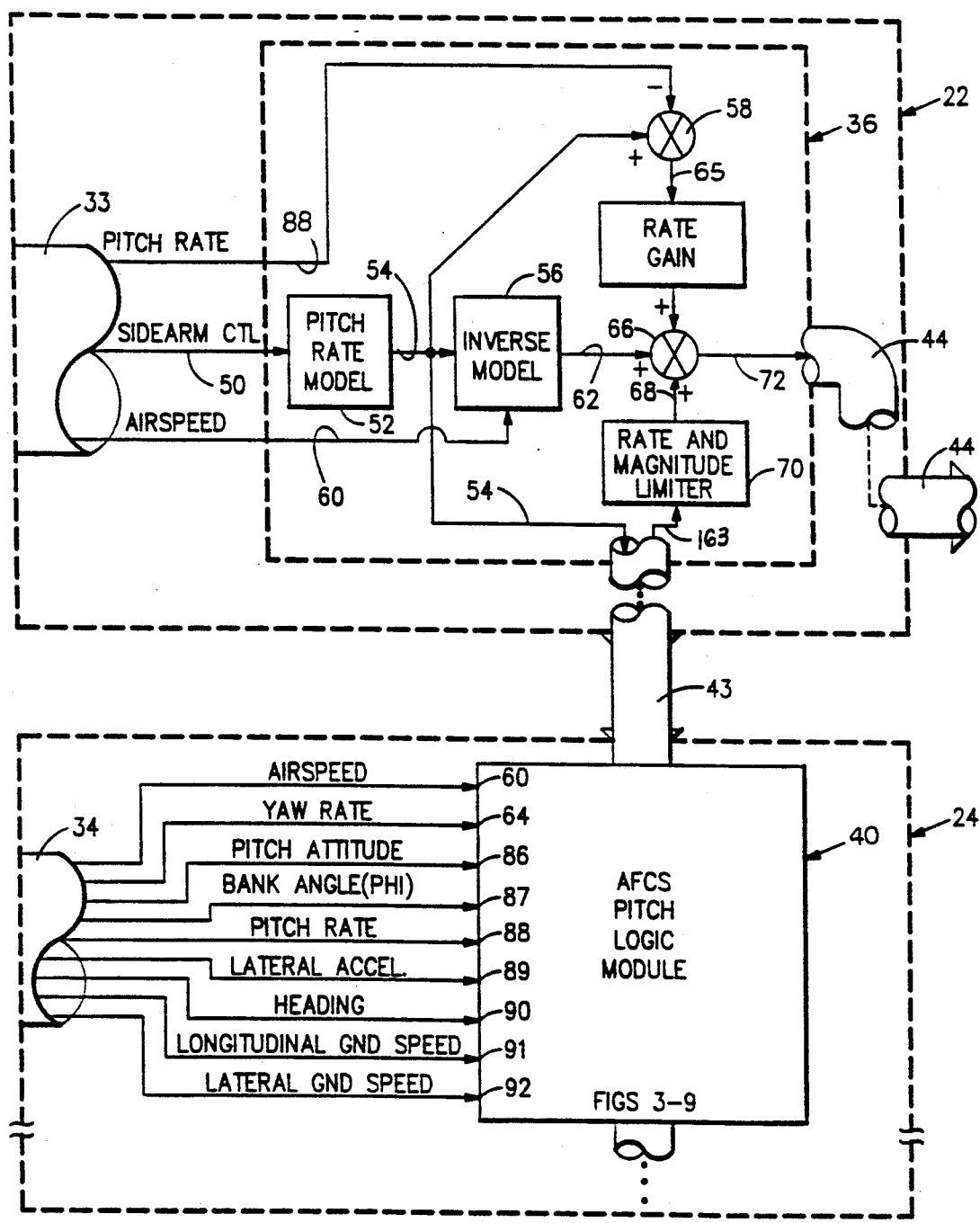
FIG. 2 is a functional illustration of the control logic used to control aircraft pitch in the system of FIG. 1.

FIG. 2 is a partial schematic section of FIG. 1, illustrating the functional interconnection of the PFCS 22 and AFCS 24 pitch logic modules 36 and 40, respectfully. The PFCS pitch logic module 36 receives a pitch axis command signal on line 50, provided through trunk lines 33 and lines 30, from the sidearm controller 29 (FIG. 1). In the present embodiment the sidearm controller is a four axis force stick in which the pitch axis command signal is generated by the pilot's imparting a longitudinal force on the sidearm controller. The pitch command signal is presented to the input of pitch rate model circuitry 52 (e.g., a first order lag filter with selected radians/sec/volt signal gain) that provides a desired pitch rate signal on a line 54 indicative of the desired rate of change for the aircraft attitude about the pitch axis. The gain of the rate model 52 varies as a function of airspeed to provide constant stick force per g of load factor. To provide this type of force response, the gain of the rate model is held constant from 0-80 knots, and for airspeed greater than 80 knots the gain decreases inversely proportional to airspeed It should be understood, selection of the pitch rate model order of magnitude is dependant on the dynamics of the aircraft and the pitch response desired.

The desired pitch rate signal on line 54 is presented simultaneously to: the input of a pitch-axis, vehicle inverse model 56, a summing junction 58, and the bus 43 to the AFCS pitch logic module 40. The inverse model 56 receives the aircraft's actual airspeed from sensors 31, through lines 32 and trunk 33, as a sensed airspeed signal on line 60. The inverse model 56 is a Z transform model, which may be embodied as a first order lead filter with instantaneous voltage gain and time constant characteristics which vary with the magnitude of the sensed airspeed signal on line 60. The cascaded pitch rate model 52 and inverse model 56 provide a feedforward path for the sidearm control signal on line 50.

The feedforward, inverse Z transform model provides the primary control input to the main rotor assembly 19 (FIG. 1) which causes the helicopter 18 (FIG. 6) to pitch at a rate set by a commanded pitch rate signal on a line 62. This desired pitch rate signal represents an approximation of the main rotor command necessary to achieve the desired pitch-axis rate of change of the aircraft for each pilot commanded pitch maneuver.

The summing function 58 sums the commanded pitch rate signal on line 54 (from the pitch rate model 52) with the aircraft's actual pitch rate, received (from sensors 31, through lines 32 and trunk 33) as a sensed pitch rate signal on line 88, to provide a pitch rate error signal on line 65. The rate error signal is amplified in a rate gain stage 64 and presented to one input of a second summing junction 66. The junction 66 also receives the commanded pitch signal on line 62 from the inverse model 56, and a pitch command modifying signal on a line 68 from a rate and magnitude limiter 70. The limiter 70, receives on a line 163 (through bus 43) a nonlimited version of the pitch command modifying signal from the AFCS pitch logic module 40, and limits the signal magnitude and rate of change to within predetermined values. The resulting sum signal is provided on the output line 72 of the PFCS pitch logic module 36, and is presented through the PFCS output trunk lines 44 to the main rotor servos (46, FIG. 1).

The magnitude and rate of change of the pitch command modifying signal from the AFCS is a function of the aircraft pitch attitude error. The aircraft pitch attitude error is the second of two feedback loops around the main rotor command signal; the first being the pitch rate error signal on line 65. As described in detail hereinafter, the pitch rate modifying signal on the line 68 is a calculated value provided by a model following algorithm within the AFCS, based on the actual aircraft response to the rotor command signal. The pitch command modifying signal modifies the magnitude and rate of change of the main rotor command signal, as a function of the difference (i.e., the error) between the desired and actual pitch attitudes.

As shown in FIG. 2, in addition to the commanded pitch rate signal received from the PFCS pitch logic module 36 on line 54 (through trunk 43), the AFCS pitch logic module 41 receives the following sensed aircraft parameters through trunk line 34: actual airspeed (line 60), actual yaw rate (line 64), pitch attitude (line 86), bank angle (PHI) (line 87), pitch rate (line 88), lateral acceleration (line 89), heading (line 90), longitudinal ground speed (line 91), and lateral ground speed (line 92). The best mode embodiment of the AFCS is as a microprocessor based electronic control system in which the algorithms of the AFCS logic modules (39-41, FIG. 1) reside in executable program listings stored in memory.

Figure 3:
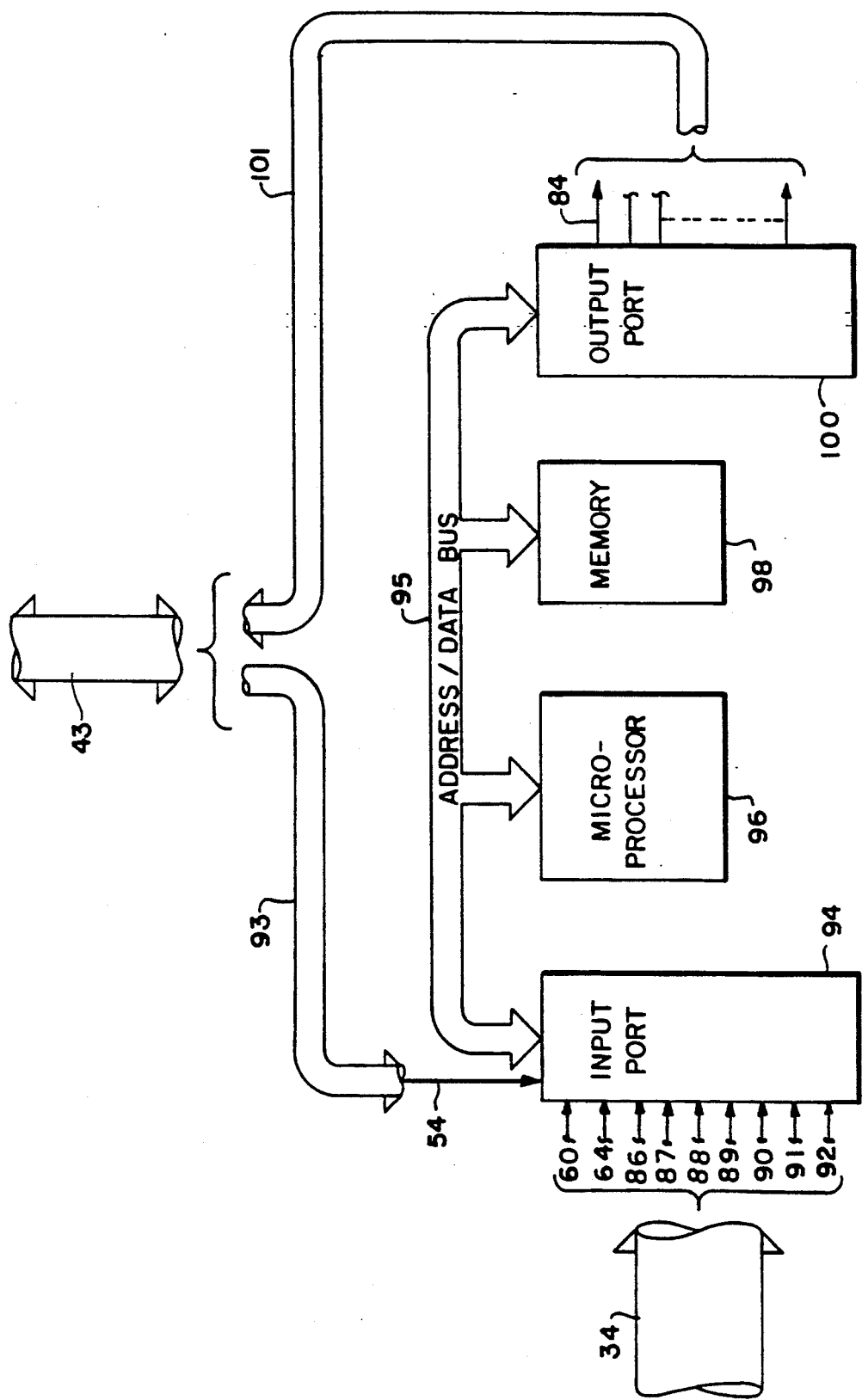
FIG. 3 is a top level block diagram of the digital electronics in the AFCS of FIG. 1.

FIG. 3, shows the architecture of a microprocessor based AFCS 24. The commanded pitch rate signal on line 54 is received from input lines 93 included within the lines 43 interconnecting the AFCS and PFCS. The sensed aircraft parameter signals on lines 60, 64, and 86-92 are received from the AFCS input trunk line 34, at an AFCS input port 94. Depending on the format of the input signals (analog or digital) the input port 94 which may include an analog-to-digital converter, a frequency-to-digital convertor, and such other signal conditioning functions known to those skilled in the art as being required to transform the input signals to digital signal format.

The input port is connected through an address/data bus 95 to a microprocessor 96 (e.g., Intel 80286, Motorola 68020), memory means 97 (including RAM, UV-PROM, EEPROM), and an output port 98. The output port may comprise a digital-to-analog converter, a parallel- to-serial convertor, a discrete output driver, and such other signal conversion functions known to those skilled in the art as being required to transform the AFCS digital signal format to that required by the control system (21, FIG. 1). The output port lines, including the line 84 to the PFCS pitch logic module 36, are presented through lines 101 to the interconnecting lines 43.

Figure 4:
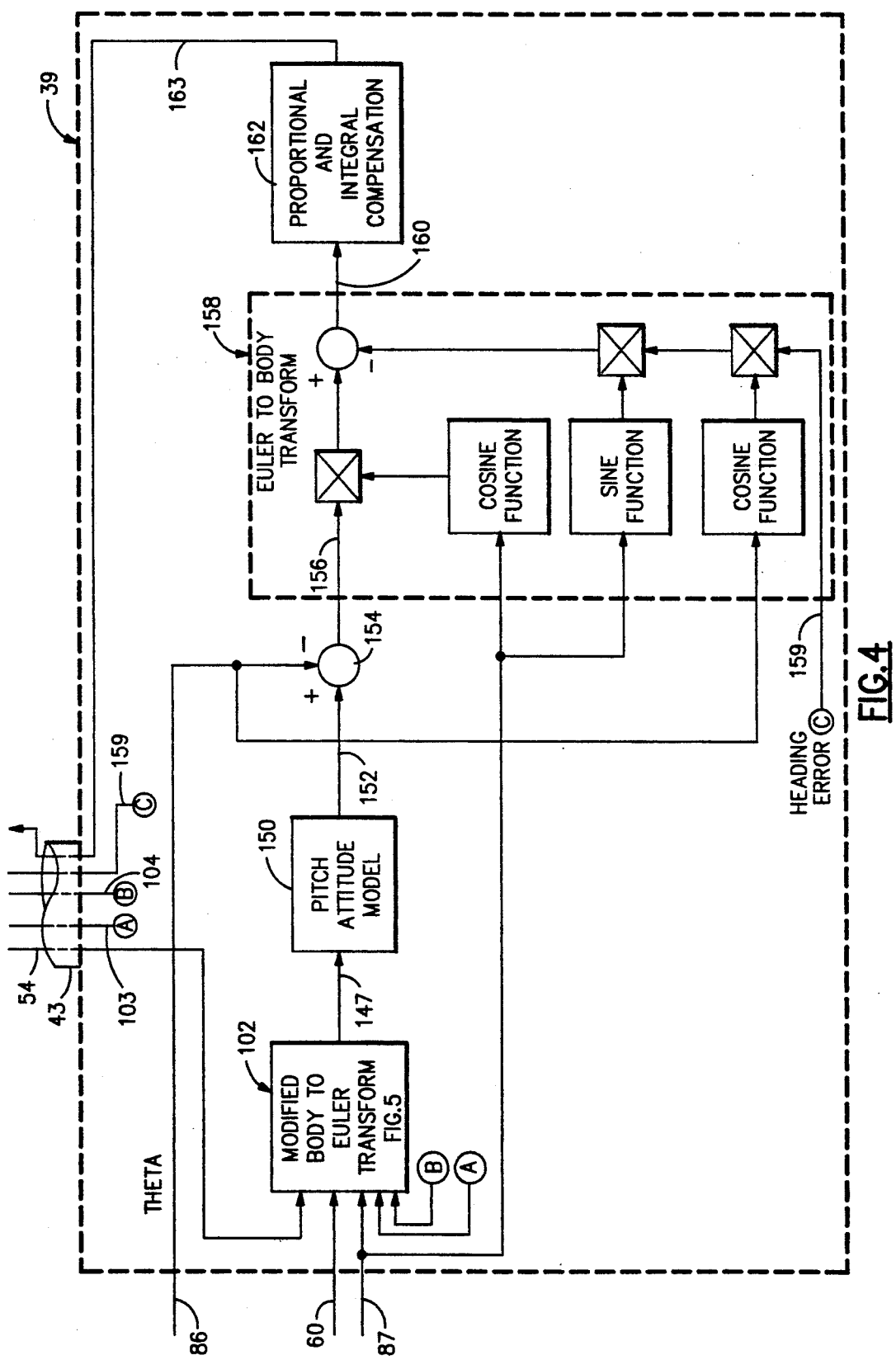
FIG. 4 is a functional illustration of pitch control logic for the AFCS of FIG. 2.
Figure 5:
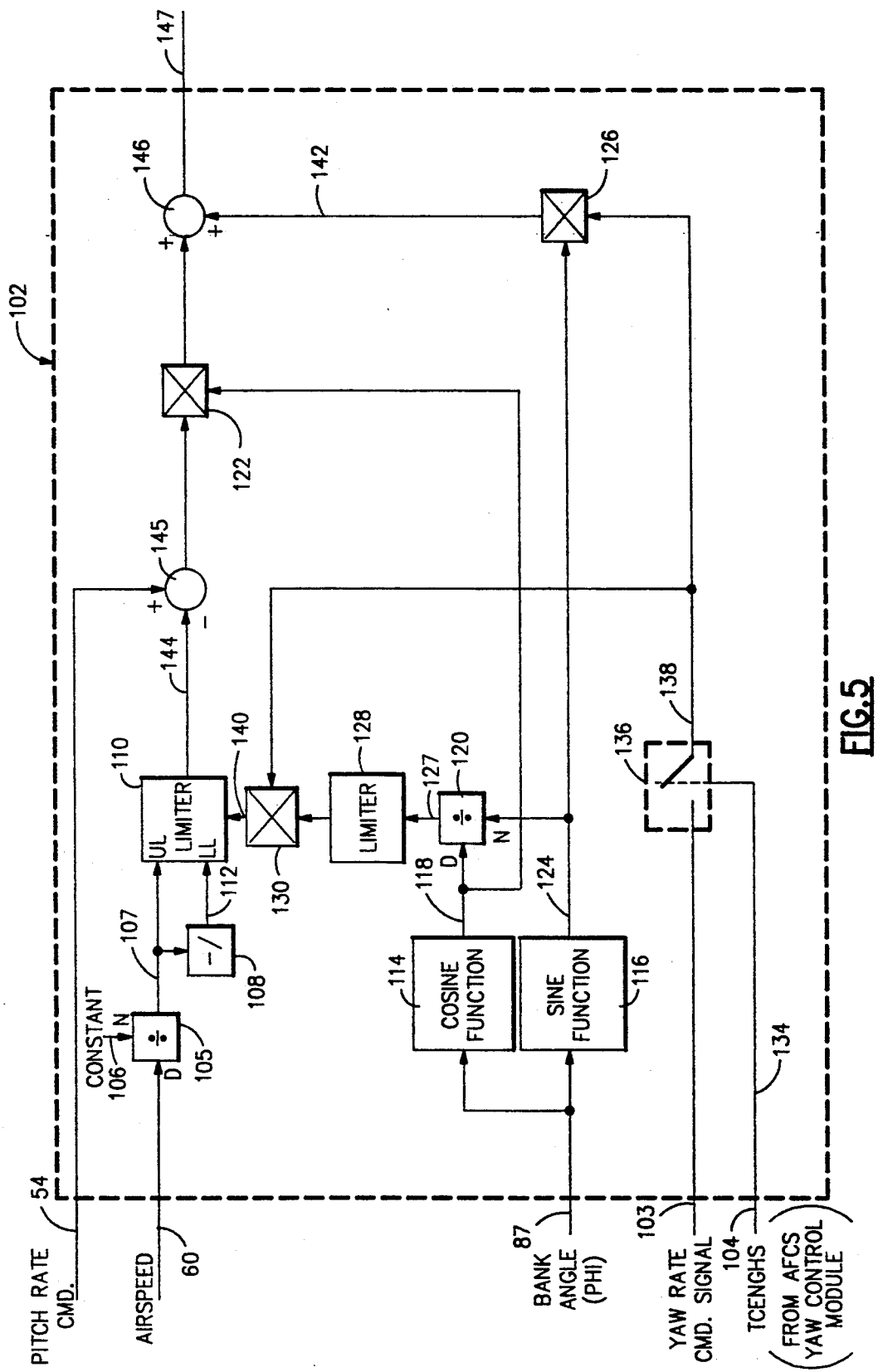
FIG. 5 is a block diagram illustration of a modified Body to Euler Transform of FIG. 3.

In FIG. 4 is illustrated a block diagram of the AFCS pitch logic modules resident in the memory 98, and executable in the microprocessor 96. The desired pitch rate signal from the PFCS is input on the line 54 to a modified Body-to-Euler transformation 102 which also receives the signals on lines 60, 87,103 and 104. In FIG. 5 is illustrated the modified Body-to-Euler Transformation 102 which works in conjunction with the pitch rate model 52 (FIG. 1), to provide the maneuvering feel of the present invention.

Conventional Body-to-Euler transformations, transform the pitch rate in terms of body axis to a pitch rate with respect to Euler axis in a manner defined by the flowing equation:

Euler pitch rate cmd.=(cos(PHI)*body pitch rate cmd.)+(sin(PHI)*body yaw rate cmd.)     (Eq. 1)

This equation cross feeds the commanded pitch and yaw rates to the yaw and pitch axes as a function of the bank angle, PHI. However, in a coordinated turn the term (sin(PHI)*body yaw rate cmd.) of Eq. 1 causes the aircraft nose to pitch down when PHI is non-zero. This requires the pilot to apply a sidearm controller input to pitch the nose up in order to maintain altitude during the banked turn. This provides maneuvering feel to the pilot since he has to apply such a command during a banked turn, but it does so at the expense of increased pilot workload. Therefore, the modified Body-to-Euler transform 102 is designed to negate the term (sin(PHI)*body pitch rate cmd.) of Eq. 1 at low bank angles to reduce pilot workload, while retaining the term at high bank angles to provide maneuvering feel.

The modified transform 102 receives the airspeed signal on the line 60, and a division function 105 divides a constant on a line 106 by the airspeed signal, resulting in a signal on a line 107. The signal on the line 107 is input to a negative unity gain 108 and a limit function 110. The upper limit for the limit function is set by the signal on the line 107, and the lower limit is set by a signal on a line 112 which is the negative of the signal on the line 107.

The transform 102 also receives the bank angle signal, PHI on the line 87 which is input to a cosine function 114 and a sine function 116. The cosine function provides a signal (indicative of the cosine of PHI) on a line 118 to a division function 120 and a multiplier 122. The sine function provides a signal (indicative of the sine of PHI) on a line 124 to the numerator input of the division function 120 and to a multiplier 126. The division function 120 provides a signal indicative of the tangent of PHI on a line 127 to a limiter 128 that provides a magnitude limited signal to a multiplier 130.

The yaw rate command signal is input to the transform on the line 103. If the high speed turn coordination function (not shown) is engaged as indicated by a discrete signal TCENGHS on the line 104, a switch 136 is placed in the closed position allowing the yaw rate command signal on the line 103 to propagate through to a line 138. Note, the switch is shown in the open position. The signal on the line 138 is input to the multiplier 130 along with the magnitude limited signal from the limiter 128, and the resultant product is provided on a line 140 to the limiter 110. Co-pending U.S. application Ser. No. 07/751,431, entitled "High Speed Turn Coordination for Rotary Wing Aircraft", filed even date herewith, is an example of high speed turn coordination which controls the discrete TCENGHS, and is hereby incorporated by reference.

The upper and lower limit values of the limit function 110 are controlled as a function of the airspeed signal on the line 60, and the constant signal on the line 106. The value of the constant determines the bank angle above which a pitch input is required by the pilot during an aircraft banked turn. As discussed hereinbefore, during low bank angle turns there is no need to provide the pilot with maneuvering feel since any advantage from providing such feel is more than negated by the increased work load placed upon the pilot. Therefore, the transform 102 only provides maneuvering feel for banked turns outside of a region whose bounds are set by the upper and lower limits of the limit function 110.

Since load factor increases in an essentially proportional relationship to airspeed for a particular pitch rate, the bounds of the limit function 110 are varied inversely proportional to the airspeed. This decreases the magnitude of the upper and lower limit signals on the lines 107,112 respectfully in response to increasing airspeed, thereby increasing the region of commanded yaw rate in which maneuvering feel is provided. However it should be pointed out that the bank angle above which maneuvering feel is initiated remains constant regardless of changes in airspeed. This threshold bank angle is used to compute the constant on the line 106, a detailed example of which is presented hereinafter.

The constant on the line 106 is calculated based upon the equation for the yaw rate command signal on the line 103, which can be expressed as:

$$R_{tc} = [g*\sin(PHI)]/V(fps) \qquad (eq.\ 2)$$

where:
$R_{tc}$ = yaw rate command signal on the line 103
g = 32 feet/second$^2$
PHI = bank angle
V(fps) = airspeed in feet/second $R_{tc}$ represents the yaw rate required for the aircraft to be in a coordinated turn while operating at a particular bank angle PHI, and airspeed. Eq. 1 can be rewritten as:

$$R_{tc} = [g*\sin(PHI)*0.5924]/V(ktd) \qquad (Eq.\ 3)$$

where:
V(ktd) = airspeed in knots.

When the switch 136 is closed, and the signal on the line 127 does not exceed the limits of the limit function 128, the signal on the line 140 can be written as, $R_{tc}*\tan(PHI)$. Substituting in the expression for $R_{tc}$ defined in Eq. 2, the expression for the signal on the line 140 can be expressed as:

$$R_{tc}*\tan(PHI) = [\tan(PHI)*g*\sin(PHI)*0.5924]/V(kts) \qquad (Eq.\ 4)$$

Assume the signal on the line 140 is within the bounds of the limit function 110, then the summing function 145 provides a signal which is equal to:

$$\text{pitch rate command} - (R_{tc}*\tan(PHI)) \qquad (Eq.\ 5).$$

Multiplication function 122 then provides a signal which is equal to the product of Eq. 4 and cos(PHI), which can be expressed as:

$$\cos(PHI)*[\text{pitch rate command} - (R_{tc}*\tan(PHI)) \qquad (Eq.\ 6).$$

Cancelling terms and performing the addition of summing function 146, provides a signal on a line 147 which is equal to:

$$\cos(PHI)*\text{pitch rate command} - R_{tc}*\sin(PHI) + R_{tc}*\sin(PHI) \qquad (Eq.\ 7)$$

Cancelling terms again yields an expression for the signal on the line 147 when the signal on the line 140 is within the limits of the limit function 110 (i.e., no maneuvering feel), and the switch 136 is closed (turn coordination is engaged). The reduced expression is equal to:

$$\cos(PHI)*\text{pitch rate command} \qquad (Eq.\ 8)$$

Comparing Eq. 8 to Eq. 1, one can see the term (sin(PHI)+body yaw rate cmd.) has been negated as desired for shallow banked turns in order to prevent the aircraft nose from pitching down during the bank turn.

During steeper banked turns, the magnitude of the signal on the line 140, defined as ($R_{tc}*\tan(PHI)$) will exceed the limits of the limit function 110. This results in the signal on the line 144 being clamped at the limit which the signal on line 140 has exceeded. Therefore, the signal on line 142 which is equal to:

$$\sin(PHI)*\text{body yaw rate cmd.} \qquad (Eq.\ 8)$$

is no longer negated, and as a result the aircraft nose is pitched down. The pilot has to respond to this downward pitching with a sidearm controller nose up pitch input in order to maintain a near constant pitch attitude during the turn. By requiring the pilot to provide this input, and varying the gain in the rate command model 52 (FIG. 1) in response to airspeed, the pilot is provided with maneuvering feel of the present invention.

As an example of computing the value for the constant on the line 106, if the bank angle desired for maneuvering feel to become active is 30 degrees, the value of the constant on the line 106 to implement this can be computed by substituting 30 degrees into Eq. 4. That is, the value of the constant on the line 106 is equal to [tan(30°)*g*sin(30°)*0.5924] which calculates out to 5.5 where g=32 feet/second$^2$.

To summarize, if the signal on the line 140 exceeds the limits of the limit function 110, then the signal on line 144 is clamped preventing the cancellation of the maneuvering feel term on the line 142. This results in providing the pilot with some maneuvering feel, while cancelling maneuvering feel during low bank angle helicopter operations in an effort to reduce pilot workload.

Referring back to FIG. 4, a desired pitch rate signal on a line 147, now in terms of Euler axes due to the transform and modified according to the need for maneuvering feel, is input to a pitch attitude model (e.g., an integrator) which integrates over time and provides a desired pitch attitude signal on a line 152. A difference function 154 computes the difference between the desired pitch attitude signal and the actual pitch attitude signal THETA on the line 86, and provides a pitch attitude error signal on a line 156. Since the pitch attitude error signal is with respect to Euler axes, rather than the body axes of the helicopter, the signal is input to a Euler-to-Body transform 158 to transform back to body axes. The Euler-to-Body transform also receives a heading error signal on a line 159 (through the bus 43)

from the AFCS yaw logic module 39. The operation of this transform 158 is clear based on the explanation of FIG. 5 presented hereinbefore, and therefore in the interest of brevity an explanation is not provided. The Euler-to-Body transform 158 provides a transformed pitch attitude error signal on a line 160 to a proportional and integral compensation function 162. The compensation contains both a proportional path and an integral path, which combine to generate on a line 163 (an unlimited) version of the pitch command modifying signal which is on the line 68). The design of proportional and integral compensators is well known in the art.

It should be understood the scope of this invention is not limited by the specific gains, lag filters, time constants, summing functions and limiting functions presented herein. Rather, it is contemplated in the practice of the present invention that the specific control laws are going to change based upon the dynamics of the plant to be controlled (e.g., an attack helicopter versus a commercial helicopter), and the peculiarities associated with each plant. As an example, the inverse model may be greater than first order. In addition it is not necessary that the flight control system be partitioned in a PFCS and an AFCS. Rather it is contemplated that the system may not be partitioned at all in some applications, whereas in other applications the system may be further partitioned into subsystems based on criteria such as reliability and maintainability.

Furthermore, while it is obvious it still is worth stating that the present invention is clearly not limited to a microprocessor based control system. The system may be implemented in a non-microprocessor based electronic system (either digital or analog).

All the foregoing changes and variations are irrelevant to the invention, it suffices a rotary wing aircraft flight control system receives inputs from a force type multi-axis sidearm controller, and schedules via an aircraft rate command model a set point for the aircraft pitch rate of change, as a function of airspeed and a pitch command signal from the sidearm controller, and provides a constant stick force per g of load factor above a certain airspeed. The rate command model is responsive to airspeed in order to schedule the constant stick force per g of load factor; the set point is used as a reference for: (1) a pitch rate of change feedback path; an integrated value of the set point is used for (2) a pitch feedback path which includes a modified body-to-Euler transform which provides maneuvering feel in steeply banked turns while cancelling the maneuvering feel during shallow banked turns; and (3) a feedforward control path having an inverse vehicle model to provide a command signal indicative of the command necessary for the aircraft to respond in a manner defined by the set point. The resultant signals from all three paths are summed to provide a magnitude and rate limited command signal which is applied to the aircraft main rotor to drive the aircraft towards a pitch rate response which is substantially equal to the desired set point; while providing the pilot with maneuvering feel of the response on the sidearm controller during steep banked turns, and constant stick force per g of load factor above the certain airspeed.

Although the present invention has been shown and described with respect to a best mode embodiment thereof, it should be understood by those skilled in the art that various other changes, omissions and additions to the form and detail thereof, may be made therein without departing from the spirit and scope of the invention.

We claim:

1. A rotary wing aircraft flight control system which receives signals indicative of aircraft pitch rate, pitch attitude, bank angle and airspeed, and responds to a pitch command from a sidearm controller to control the pitch of an aircraft, comprising:

(a) means responsive to the airspeed signal and the pitch signal, for scheduling and providing a set point signal indicative of the desired aircraft pitch rate of change, which provides a constant sidearm controller force as a function of load factor on the main rotor;

(b) means for computing the difference between said set point signal and the pitch rate signal, and for providing a pitch rate error signal indicative thereof;

(c) inverse model means responsive to said set point signal for scheduling a feedforward command signal to drive the aircraft to respond in a manner which is essentially equal to said set point signal;

(d) means responsive to said set point signal and the pitch attitude signal, comprising
        (1) means for providing maneuvering feel on the sidearm controller when the bank angle of the aircraft exceeds a predetermined value by conditioning said set point signal;
        (2) means for integrating over time said conditioned set point signal to provide a desired pitch attitude set point, for comparing said desired pitch attitude set point and the pitch attitude signal and providing a pitch attitude error signal indicative of the difference; and (e) means responsive to said pitch rate error signal, said feedforward command signal, and said pitch attitude error signal, for providing a pitch command signal to the main rotor of the aircraft.

2. A helicopter flight control system of the type which receives signals indicative of: the helicopter's actual pitch attitude, actual pitch attitude rate of change bank angle and airspeed; a force type sidearm controller provides a pitch axis command signal; the flight control system controls the helicopter pitch by providing to the helicopter's main rotor a set point signal value indicative of the desired main rotor blade tip path to achieve a certain pitch attitude, while providing maneuvering feel for the pilot, the flight control system comprising:

(a) rate model means, responsive to the airspeed signal, for providing for each value of the pitch axis command signal presented thereto, a corresponding signal value for the helicopter's desired pitch rate of change which is conditioned as a function of the airspeed signal to provide a constant force on the sidearm controller as a function of load factor on the main rotor blade;

(b) means for providing maneuvering feel on the sidearm controller for the pilot, by biasing said desired pitch rate of change signal value such that the aircraft nose is pitched slightly downward during a steeped banked turn, and for providing a biased desired pitch rate of change signal value indicative thereof;

(c) means for integrating over time said biased desired pitch rate of change signal value to provide a desired pitch attitude set point signal value;

(d) means for computing the difference between said desired pitch attitude set point signal value and the actual pitch attitude signal value, and for providing a pitch attitude error signal value indicative thereof;

(e) inverse model means, for providing for each value of said desired pitch rate signal value, a feedforward pitch set point signal value indicative of the pitch required for the helicopter to aerodynamically respond about its pitch axis at a rate set by said desired pitch rate set point signal value;

(f) means for summing said feedforward-pitch set point signal value, said pitch rate error signal value, and said pitch attitude signal value, and for providing as the summation thereof the set point signal value; and (g) means for outputting the set point signal value to the helicopter main rotor.

3. The flight control system of claim 2, wherein said means for providing maneuvering feel pitches the nose of the aircraft down when the magnitude of the bank angle signal value exceeds a certain threshold value which is computed as a function of the airspeed signal value.

4. The flight control system of claim 3, wherein said rate model means comprises a lag filter having a variable gain whose value is set as function of the airspeed signal value, said variable gain value is a constant value for the airspeed signal values from zero to approximately eighty knots, and decreases from said constant value in inversely proportional manner as a function of airspeed signal values above approximately eight knots airspeed.

5. The flight control system of claim 4, wherein said means for providing maneuvering feel comprises:

means for computing the tangent of the bank angle signal value, and for providing a tangent signal indicative thereof; and means for computing the product of said tangent signal value and the yaw rate command signal value, and for limiting the magnitude of the resultant produce within variable limit values indicative to said threshold value and set as a function of the airspeed signal value, and for providing said variable bias signal values as a signal indicative to the magnitude limited product.

6. The flight control system of claim 5, wherein said inverse model means includes a first order lead filter which provides said feedforward pitch set point signal value.

7. The flight control system of claim 6, further comprising:

a body-to-Euler transformation for transforming said biased desired pitch rate of change signal value from its basis with respect to helicopter body axes to a new basis with respect to Euler inertial coordinates; and means for retransforming said pitch attitude error signal value from its basis with respect to Euler inertial coordinates back to the basis with respect to the helicopter body.

8. A flight control system for a helicopter of the type having: sensors which provide signals indicative of the helicopter's actual pitch attitude, actual pitch attitude rate of change, bank angle and airspeed; a sidearm controller provides a pitch axis command signal; the flight control system controls the helicopter pitch by providing to the helicopter's main rotor a set point signal value indicative of the desired main rotor blade tip path to achieve a certain pitch attitude, the flight control system comprising:

(a) rate model means, responsive to the airspeed signal, for providing for each value of the pitch axis command signal presented thereto, a corresponding signal value for the helicopter's desired pitch rate of change, which is conditioned as a function of the airspeed signal to provide a constant force on the sidearm controller as a function of load factor on the main rotor blade;

(b) a body-to-Euler transformation for transforming said desired pitch rate of change signal value from its basis with respect to helicopter body axes to a new basis with respect to Euler inertial coordinates, and for conditioning said desired pitch rate of change signal value to provide maneuvering feed to the pilot, comprising means, for biasing said desired pitch rate of change signal value with a variable bias value computed as a function of the airspeed and bank angle signal values, for limiting the magnitude of said variable bias signal value as a function of the airspeed signal value such that maneuvering feel is only provided during stepped banked turns, and for providing a biased desired pitch rate of change signal value indicative of the biased value of said desired pitch rate of change signal value;

(c) means for integrating over time said biased desired pitch rate of change signal value to provide a desired pitch attitude set point signal value;

(d) means for computing the difference between said desired pitch attitude set point signal value and the actual pitch attitude signal value, and for providing a pitch attitude error signal value indicative thereof;

(e) means for retransforming said pitch attitude error signal value from its basis with respect to Euler inertial coordinates back to the basis with respect to the helicopter body;

(f) means for computing the difference between said actual pitch rate signal value and said desired pitch rate signal value, and for providing a pitch rate error signal value indicative of the difference;

(f) inverse model means, for providing for each value of said desired pitch rate signal value, a feedforward pitch set point signal value indicative of the pitch required for the helicopter to aerodynamically respond about its pitch axis at a rate indicative of said desired pitch rate set point signal value;

(h) means for summing said feedforward pitch set point signal value, said pitch rate error signal value, and said pitch attitude signal value, and for providing as the summation thereof the set point signal value; and (i) means for outputting the set point signal value to the helicopter main rotor.

9. The flight control system of claim 8, wherein said rate model means includes a first order lag filter having a variable gain value which is a function of the airspeed signal value, said variable gain value is a constant value for the airspeed signal values from zero to approximately eighty knots, and said variable gain value decreases inversely proportional to the airspeed signal for values greater than approximately eighty knots.

10. The flight control system of claim 9, wherein said means for providing maneuvering feel comprises:

means for computing the tangent of the bank angle signal value, and for providing a tangent signal indicative thereof; and means for computing the product of said tangent signal value and the yaw rate command signal value, and for limiting the magnitude of the resultant produce within variable limit values set as a function of the airspeed signal value, and for providing said variable bias signal value as a signal indicative of the magnitude limited product.

* * * * *

UNITED STATES PATENT AND TRADEMARK OFFICE
CERTIFICATE OF CORRECTION

PATENT NO. : 5,213,282
DATED : May 25, 1993
INVENTOR(S) : Phillip J. Gold, et al It is certified that error appears in the above-identified patent and that said Letters Patent is hereby corrected as shown below:

Claim 4, column 11, line 30, "eight" should read --eighty--

Claim 5, column 11, line 40, "produce" should read --product--

Claim 5, column 11, line 41, "to" should read --of--

Claim 5, column 11, line 43, "values" should read --value--

Claim 5, column 11, line 43, "to" should read --of--

Claim 8, column 12, line 17, "feed" should read --feel--

Claim 10, column 14, line 1, "produce" should read --product--

Signed and Sealed this

Eighth Day of March, 1994

Attest:

BRUCE LEHMAN

Attesting Officer

Commissioner of Patents and Trademarks